United States Patent
Kreiner et al.

(10) Patent No.: US 8,636,940 B2
(45) Date of Patent: Jan. 28, 2014

(54) METHOD FOR MANUFACTURING A FILTER END DISC AND A FLUID FILTER, FILTER END DISC

(75) Inventors: Anton Kreiner, Reisbach (DE); Josef Rohrmeier, Laberweinting (DE); Frank Pflüger, Sachsenheim (DE)

(73) Assignee: Mann + Hummel GmbH, Ludwigsburg (DE)

( * ) Notice: Subject to any disclaimer, the term of this patent is extended or adjusted under 35 U.S.C. 154(b) by 199 days.

(21) Appl. No.: 13/121,910

(22) PCT Filed: Sep. 30, 2009

(86) PCT No.: PCT/EP2009/062667
§ 371 (c)(1),
(2), (4) Date: Jun. 7, 2011

(87) PCT Pub. No.: WO2010/037767
PCT Pub. Date: Apr. 8, 2010

(65) Prior Publication Data
US 2011/0220566 A1 Sep. 15, 2011

(30) Foreign Application Priority Data
Sep. 30, 2008 (DE) .......................... 10 2008 049 627

(51) Int. Cl.
*B29C 45/16* (2006.01)
*B29C 65/16* (2006.01)
*B01D 29/07* (2006.01)

(52) U.S. Cl.
USPC ................ 264/328.8; 264/248; 264/DIG. 48; 210/232; 210/454; 210/493.2; 210/497.01

(58) Field of Classification Search
None
See application file for complete search history.

(56) References Cited

U.S. PATENT DOCUMENTS 3,850,813 A * 11/1974 Pall et al. ....................... 210/232
3,966,372 A 6/1976 Yasuike et al.
(Continued)

FOREIGN PATENT DOCUMENTS

DE 102005024238 A1 11/2006
DE 102006028116 B4 7/2008
EP 1695751 8/2006

OTHER PUBLICATIONS

XP001125593, Sep. 1, 2002. German language original and English machine translation.

*Primary Examiner* — Edmund H. Lee
(74) *Attorney, Agent, or Firm* — James Hasselbeck (57) ABSTRACT

In a method for manufacturing a filter end disc (7), for example for a fluid filter (14) of a motor vehicle, a first plastic molding material (M1) and a second plastic molding material (M2) are injected in succession into a tool mold (1) in a monosandwich method or co-injection method in such a way that the second plastic molding material (M2) is substantially surrounded by the first plastic molding material (M1). To manufacture a fluid filter, the filter end disc (7) is further irradiated by a radiation beam (L) having pre-determined beam characteristics for melting the first plastic molding material (M1), and a filter material (15) is applied to the at least partially melted first plastic molding material (M1). A filter end disc (7), in particular for a fluid filter (14) of a motor vehicle, said disc being manufactured according to a monosandwich method or co-injection method, comprises a first outer plastic molding material (M1) and a second inner plastic molding material (M2). In the process, the second plastic molding material (M2) is surrounded by the first plastic molding material (M1) and the first plastic molding material (M1) is impermeable to water and/or water vapor.

16 Claims, 7 Drawing Sheets

(56) References Cited

U.S. PATENT DOCUMENTS

| | | | |
|---|---|---|---|
| 5,238,717 A * | 8/1993 | Boylan | 428/35.7 |
| 6,231,798 B1 * | 5/2001 | Matsumoto et al. | 264/255 |
| 6,248,289 B1 * | 6/2001 | Schneider | 419/5 |
| 8,114,238 B2 * | 2/2012 | Rohrmeier et al. | 156/272.2 |
| 8,177,972 B2 * | 5/2012 | Grummert et al. | 210/232 |
| 2009/0045132 A1 | 2/2009 | Schwinghammer | |
| 2011/0005671 A1 | 1/2011 | Kreiner | |

* cited by examiner

METHOD FOR MANUFACTURING A FILTER END DISC AND A FLUID FILTER, FILTER END DISC

CROSS REFERENCE TO RELATED APPLICATIONS

This application is US National Stage Entry of international patent application no. PCT/EP2009/062667, filed Sep. 30, 2009 designating the United States of America, the entire disclosure of which is incorporated herein by reference. Priority is claimed based on German application 10 2008 049 627.8 filed in Germany on Sep. 30, 2008.

TECHNICAL FIELD

The present invention concerns a method for manufacturing a filter end disc as it is needed, for example, for a fluid filter in a motor vehicle. Often cylinder-shaped fluid filters are used in which a filter material that is provided with longitudinal folds is arranged between two filter end discs. Such filters serve, for example, as fuel filters or also as air filters in a car or truck.

PRIOR ART

Conventionally, disc-shaped filter end plates of plastic material are manufactured by an injection molding method and subsequently connected to a tube of folded nonwoven filter material. In this connection, onto the topside or bottom side of the fold profiles and/or end discs, for example, an adhesive can be applied that ensures a fluid-tight closure.

Since partially in particular thermoplastic synthetic materials are used for the end discs, there is also the possibility to heat the filter end disc at the side that is facing the filter medium so that the thermoplastic material melts. Into the partially melted filter end disc the fold profile is then pressed and, after the plastic material has become solid again, a closure that is as tight as possible is produced. A problem of the last mentioned method is the heating of the filter end disc that should be as fast but still as uniform as possible so that the fold edges can be pressed in. In order to achieve a fluid-tight closure, at least a certain layer depth of the end plate must be melted; this slows down the manufacturing process in a mass production of corresponding fluid filters.

It is therefore an object of the present invention to provide an improved method for manufacturing filter end discs.

SUMMARY OF THE INVENTION

Therefore, a method for producing a filter end disc, such as, for example, for a fluid filter of a motor vehicle, is disclosed wherein a first plastic molding material and a second plastic molding material in accordance with a mono-sandwich method or co-injection method are injected into a mold in such a way that the second plastic molding material is substantially enclosed by the first plastic molding material.

The mono-sandwich method or co-injection method has been found to be particularly suitable wherein the first and the second plastic molding materials are injected into the mold. In contrast to a two-component injection molding method the introduction of the two components or plastic molding materials is carried out by means of a worm stroke and not sequentially by two separate injection devices in a reversal mold or by repositioning.

The inner volume of the mold into which the first and second plastic molding materials are injected is preferably constant during the injection process. This means that the mold with respect to its inner geometry during the mono-sandwich injection or co-injection injection process remains unchanged. In case of a two-part mold, the same is opened only for removal of the injection-molded filter end disc, for example.

In conventional injection molding methods that produce multi-component injection-molded parts, often the shape itself is changed during the injection process. Conventional are, for example, cylindrical molds whose inner cylindrical volume for distributing the liquid injected plastic molding material is made smaller. Such meshing plunger-like tools are not required in the proposed method. The manufacturing method therefore can be implemented faster and in a simpler way.

The first plastic molding material in one variant of the method is water-impermeable and/or water vapor-impermeable in the solid state. In this way, a protection of the second plastic molding material is achieved which, in general, forms the inner core of the end disc. Should the second plastic molding material in the solid state have hygroscopic properties, embedding of water is prevented. This is in particular advantageous when the inner plastic molding material must be heated or melted in further processing steps because water could result otherwise in disruptive bubbles. Insofar, the storage and processing properties are improved.

As inner core material, i.e., second plastic molding material, polyamide can be used, for example, which, on the one hand, is simple and inexpensive to process, on the other hand, absorbs however water, i.e., is hygroscopic. By selecting a first water-impermeable plastic molding material, such as, for example, polypropylene, by means of the mono-sandwich method or co-injection method a closed seal-tight surface is obtained. The first plastic molding material encloses then, for example, like a film or skin the second plastic molding material.

The plastic molding materials are moreover preferably selected such that the second plastic molding material will convert a radiation with predetermined radiation properties more strongly into heat than the first plastic molding material.

According to a further variant of the method, the mold is shaped such that upon injection the first plastic molding material will penetrate into recesses of the mold and fill them in such a way that a sealing element of solidified first plastic molding material is generated that projects from an end face of the filter end disc.

The recess in the molding tool or the mold provides, for example, a sealing lip on an end face of the finished filter end disc. It is particularly advantageous when the sealing element that is projecting from the filter end disc exclusively comprises the first plastic molding material and moreover, optionally, the first plastic molding material in the solid state is softer and/or more flexible than the second plastic molding material in the solid state.

The resulting sealing element upon further processing, for example, is melted partially or entirely and the rim or the fold profile of a cylindrical fold pack is pressed into it and joined in a fluid-tight way upon cooling.

In one embodiment of the method and one filter end disc several concentric sealing webs or sealing lips are provided that project from the filter end disc.

For example, when using thermoplastic material as plastic molding materials, because of the sequentially performed injection into the mold, it is provided that the first plastic molding material will solidify on the inner walls of the mold during the injection process and the second plastic molding material will substantially form an inner core of the thus produced filter end disc. By selecting the two plastic molding materials with predetermined properties with regard to energetic conversion of the irradiated radiation into heat energy, a particularly beneficial re-melting of the filter end disc in further processing steps for forming a complete fluid filter can be achieved.

In particular polyamide as a thermoplastic material is suitable as a filter end disc material and for injection into a mold. In order to realize the desired absorption, reflection and transmission properties of the two plastic molding materials, the first plastic molding material can be selected, for example, such that it has a lower absorbance than the second plastic molding material. The first plastic molding material has preferably moreover a lower reflectance than the second plastic molding material. The first plastic molding material moreover can have a higher transmittance than the second plastic molding material. In this connection, the absorbance, reflectance, and transmittance are understood to relate to a predetermined radiation.

The radiation can be, for example, heat radiation from an infrared radiator, for example, laser, glow filament or light-emitting diode array. As possible wavelengths of the infrared radiation 780 up to 3,000 nm, in particular 900 nm up to 1,500 nm, or even more narrow-banded, 900 nm up to 1,100 nm, are possible that are also used in conventional fusing methods in connection with plastics.

Since the outer first plastic molding material is substantially more transparent, an irradiated heat radiation first passes through the outer surface of the filter end disc and then heats, at the boundary surface between the two plastic molding materials, an area of the filter end disc positioned underneath the surface. In this way, an especially beneficial temperature profile adjustment results which makes it easier, for example, to join a filter material and the filter end disc.

In one variant of the method, moreover coloring of the first and the second plastic materials is done in such a way that the respective absorption, reflection and/or transmission properties for the radiation remain substantially unchanged. The plastic molding materials have however the same color in spite of this. In this way, visually it cannot be recognized that the filter end disc is comprised of two components, i.e., the first and the second plastic molding materials. There exist in particular suitable dyes that are transparent for infrared radiation and thus practically have no effect on the temperature profile perpendicular to a surface of the filter end disc.

The second plastic molding material, for example, can be made of the first plastic molding material in that soot particles for increasing the absorbance are admixed. This has, for example, the advantage that the rheologic properties of both plastic molding materials will only differ insignificantly and processing, for example, in an injection molding machine, is particularly easy.

Moreover, a method for producing a fluid filter is proposed. In this connection, first a method as mentioned above for producing a filter end disc is performed. Subsequently, irradiation of the filter end disc is carried out by means of a radiation with the predetermined radiation properties for melting the first plastic molding materials. Then a filter material is applied onto the at least partially melted first plastic molding material. For example, a folded rim of the filter material can be pressed into the melted first plastic molding material.

The present invention further encompasses a fluid filter for a motor vehicle produced according to the aforementioned method.

Moreover, a filter end disc, in particular for a fluid filter of a motor vehicle, that is produced according to a mono-sandwich method or co-injection method, is claimed. In this connection a first outer plastic molding material and a second inner plastic molding material are provided wherein the second plastic molding material is enclosed by the first plastic molding material. The first plastic molding material is then water-impermeable and/or water vapor-impermeable.

The second plastic molding material may be hygroscopic such as e.g. polyamide and the first plastic molding material can be, for example, modified polypropylene that is water-impermeable. The two plastic molding materials are selected such that they are processed in particular by a mono-sandwich method and adhere to each other within the filter end disc.

Insofar, the first plastic molding material preferably forms a closed water-tight and/or water vapor-tight outer surface of the filter end disc.

Encompassed by the invention is also a filter end disc with a first outer plastic molding material and a second inner plastic molding material wherein the second plastic molding material is enclosed by the first plastic molding material. In this connection, the enclosure can be complete, in particular when the first plastic molding material is water vapor-tight, or in alternative configurations, may also exist only partially, for example, on a flat side of the filter end disc to 50% of the surface area, preferably to more than 90% of the surface area.

The first plastic molding material of the filter end disc may have a reduced absorption in one wavelength range, for example, infrared, in comparison to the second plastic molding material. Upon irradiation with this wavelength, the core or the second plastic molding material is heated more strongly than the outer plastic molding material that encloses the core. The first outer plastic molding material can moreover have a lower softening point or melting point than the second inner plastic material. In any case, by heating the second inner plastic material the first outer plastic material can be heated such that a connection with a folded bellows is enabled.

A particularly strong heating can be realized, for example, at one of the boundary surfaces of the first plastic material to the second plastic material on the side of the second plastic material.

Moreover, the present invention encompasses a fluid filter for a motor vehicle with a filter end disc as described in the various embodiments. In particular, a motor vehicle fluid filter with a folded bellows, in particular a star-shaped folded bellows. In particular, the invention encompasses an oil or fuel filter with one or several disclosed filter end discs.

Further possible implementations of the invention encompass also combinations, not explicitly mentioned, of features, method steps or configurations with regard to the embodiments described above or in the following. In this connection, a person skilled in the art will also add individual aspects as improvements or supplements to the respective basic form of the invention.

Further embodiments of the invention are subject matter of the dependent claims as well as of the embodiments disclosed in the following.

BRIEF DESCRIPTION OF THE DRAWINGS

The invention will be explained in the following in more detail with the aid of embodiments illustrated in the attached drawings. It is shown in.

In the Figures the same or functionally the same elements are identified with the same reference numerals, if not noted otherwise.

EMBODIMENT(S) OF THE INVENTION

Figure 1A:
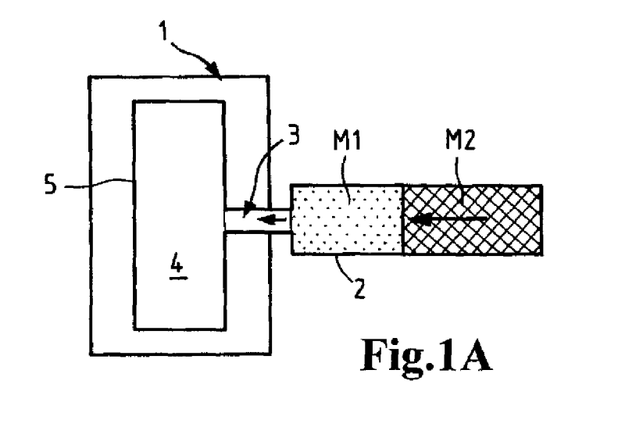
FIGS. 1A-1C: a sequence of method steps for producing a filter end disc.
Figure 1B:
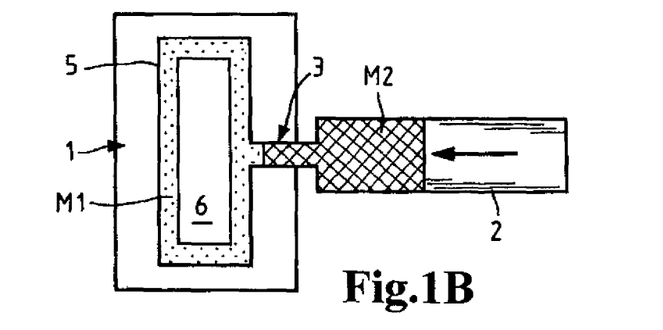
Figure 1C:
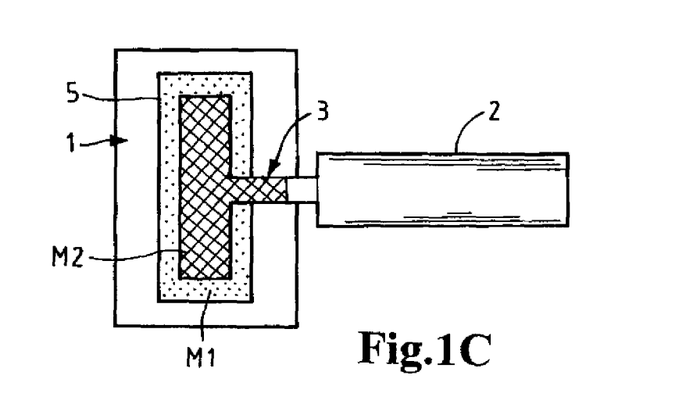

In the FIG. 1 method steps of a method for producing a filter end disc are shown. FIG. 1 shows a mold 1 with a cavity 4 that is enclosed by a cavity wall 5. The cavity 4 is filled with heated thermoplastic plastic molding material, for example, suitable polyamide for molding the filter end disc. For this purpose, in the mold 1 an opening 3 is provided that is coupled to an extruder 2 into which the plastic molding materials M1 and M2 can be filled. For example, by means of a plunger or worm or other suitable conveying device the material sequence M1 and M2 can be injected into the mold 1.

FIG. 1A shows a situation before injection of the two plastic molding materials M1, M2 into the mold 1. The first plastic molding material M1, which later on is to form an outer envelope of the filter end disc, is filled into the extruder 2 such that upon injection it reaches first through the opening 3 the cavity 4 of the mold 1. Behind the first plastic molding material M1 a second plastic molding material M2 is provided that, for example, is also comprised of polyamide that, by suitable additives, differs from the first material M1, for example, with respect to its radiation absorption properties. The materials M1 and M2 are filled into the extruder 2 such that they can be pressed sequentially into the opening 3 in the mold 1.

Material M1 can be selected, for example, also as a water impermeable material such as polypropylene. In this way, as will be explained in the following, a protective envelope can be generated about the material M2, which is water-absorbing, i.e., hygroscopic. An undesirable embedding of water during storage of the produced end discs is then prevented. In order to ensure compatibility of the two plastic molding materials M1, M2 with each other with the selected properties, for example, modified polypropylene of the type Admer QB510E is used as M1 and polyamide as M2.

FIG. 1B illustrates the injection process for the first plastic molding material M1 which is introduced in the hot, substantially liquid, state into the mold 1. Since on the rims or the surface 5 of the inner wall 5 in the cavity 4 of the mold 1 the plastic molding material M1 that has been injected first will solidify, the first plastic molding material M1 will distribute substantially across the inner wall 5. Only subsequently, the second plastic molding material M2 is also injected or pressed through the opening 3 into the mold 1. FIG. 1B shows the state in which the first plastic molding material M1 has just been injected completely into the mold 1 and the second plastic molding material M2 passes through the opening 3. Accordingly, the second plastic molding material M2 is then injected also through the opening 3 into the mold 1.

As a result of the already existing solidification of the first plastic molding material M1 on the inner wall 5 a cavity 6 can be produced into which the second plastic molding material M2, as illustrated in FIG. 1C, will flow. The two plastic molding materials M1, M2 in suitable dosage are now in the mold 1 wherein the second plastic molding material M2 forms a core of the resulting filter end disc and the first plastic molding material M1 forms the outer surface. With regard to the arrangement of the mold 1 and the extruder 2 as well as the injection rates of the two sequentially injected plastic molding materials M1, M2, these factors can be adjusted such that a suitable distribution of the materials in the interior 4 of the mold 1 will result.

Figure 2A:
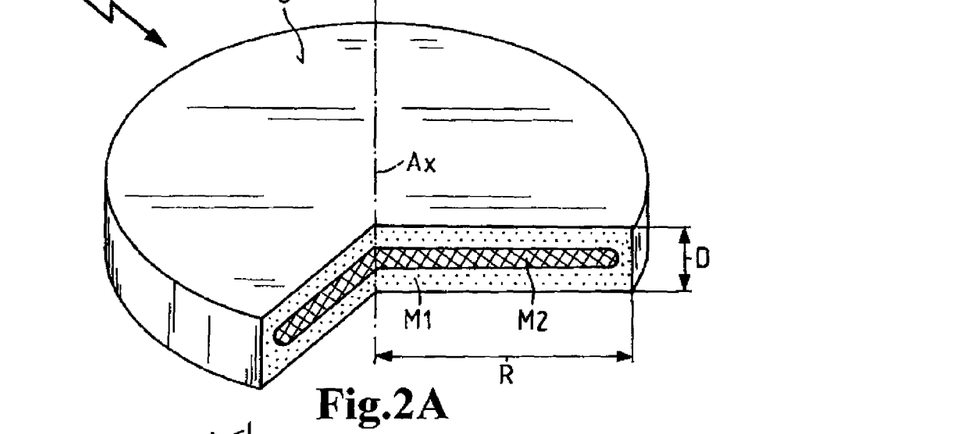
FIGS. 2A and 2B: a perspective view of a filter end disc and its radiation absorption properties.

In FIG. 2 a correspondingly produced filter end disc 7 is explained in detail. FIG. 2A shows a perspective view of an embodiment of a filter end disc that, for example, is substantially embodied of a circular shape with a radius R and a thickness D. The filter end disc 7 comprises two materials of which a first material M1 forms an outer envelope and a second material M2 forms a core of the filter end disc 7. The surface O of the filter end disc 7 is comprised therefore substantially only of material M1.

On the one hand, the material combination can be selected such that the hygroscopic core M2 is surrounded by an envelope M1 that shields with regard to moisture. Since the frequently employed polyamide is hygroscopic and therefore absorbs moisture from the air, without the protective envelope of M1 disturbances during the further processing steps will occur. In a fusing process that is often required in order to connect the end disc 7 and a filter bellows, in case that inner moisture is present, bubble formation may result, which is undesirable. The water in the end disc component then foams the liquid melted plastic molding material and a secure and seal-tight fusing action is hardly possible.

In the past, premanufactured end discs therefore had to be dried in a complex process. These otherwise required additional measures are not required in the proposed variant in which the first plastic molding material injected by the mono-sandwich method is water-impermeable or water vapor-impermeable. Appropriate suitable materials are known, for example, from the manufacture of plastic films.

On the other hand, the plastic molding materials can also have further functional properties that are advantageous with regard to further processing and manufacture of filter elements. It is in particular possible to adjust the absorption properties in a targeted fashion.

Figure 2B:
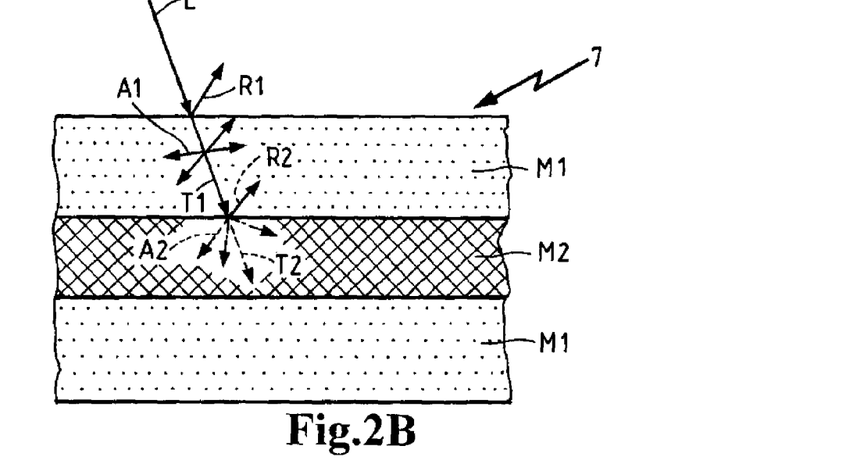

In FIG. 2B a detail of a cross-section of the filter end disc 7 is illustrated. In this connection, a sequence of material layers M1, M2 and M1 results. The materials M1 and M2 are, for example, selected such that the outer material M1 or the first plastic molding material M1 in the solidified state is different from material M2 with respect to heat transmission, absorption and reflection properties. The two materials are selected such that the inner core material M2 converts more strongly the impinging radiation into heat than the material M1. Moreover, water impermeability of the outer layer M1 may exist.

For explanatory purposes, infrared radiation L, for example, is illustrated as an arrow and impinges on the filter end disc 7. For example, it is necessary to melt the materials M1 and M2 to a certain depth in order to press into the melted plastic material a folded nonwoven filter material as a filter medium and to connect it to the filter end disc 7. In this connection, it is especially desirable that an area of a depth of approximately 1-2 mm, viewed from the surface of the filter end disc, is melted. This must be done as quickly as possible in order to accelerate the manufacturing process of the resulting filters.

Inasmuch as no moisture exists in the inner material M2, a melting action can be achieved that can be easily controlled. Otherwise, bubbles and foam would be produced that would impair further processing. The outer "protective layer" M1 ensures that, upon production and storage of the blanks of the end discs, no absorption of water or moisture in the hygroscopic core material M2 may occur.

Essentially, there are three processes when radiation impinges on a material. On the one hand, portions of the irradiated radiation L are reflected. This is indicated at the boundary surface between, for example, air and the first material M1 by the arrow R1. At the boundary surface between materials M1 and M2 reflection may occur also which is illustrated by arrow R2. Moreover, also portions of the light or radiation L may pass through or penetrate the respective material. This is indicated by arrows T1 and T2 in the drawing and also is expressed generally by a transmittance. Moreover, an absorption in the materials upon passage of the radiation occurs. The arrows A1 illustrate the absorption in the upper material M1 and the arrows A2 that are indicated in dashed lines the absorption of the radiation in material M2. As already indicated, these properties regarding irradiation of materials can be expressed by absorbance A, transmittance T, and reflectance R. This results, for example, in the correlation: A+T+R=1 which expresses the mutual dependency of the different processes in the material.

The materials in the manufacturing process for a filter end disc are selected such that an impinging radiation L, such as e.g. from an infrared radiator for a fusing process, will heat more strongly the second material M2 that is deeper down within the core of the filter end disc 7 than the surficially arranged plastic molding material M1.

Figure 3:
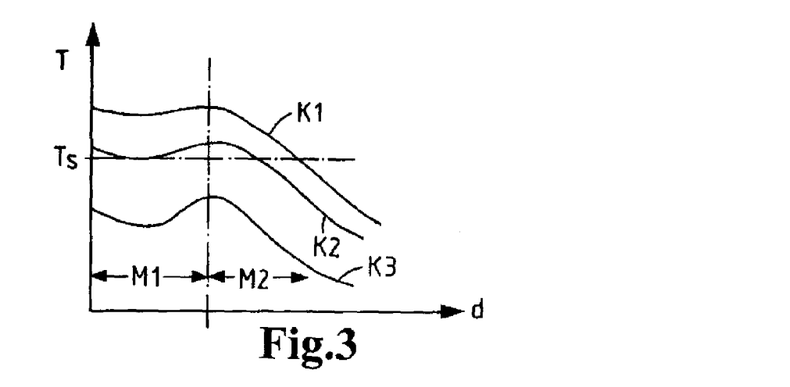
FIG. 3: a diagram for explaining the temperature profile upon heat irradiation on a filter end disc.

In FIG. 3 a course of the temperature along, for example, an axis Ax of the filter end disc 7 illustrated in FIG. 2 is illustrated at various radiation durations of infrared radiation. On the X axis the depth d is illustrated and on the Y axis the course of the temperature T. Three curves are indicated wherein the upper curve K1 corresponds to the longest radiation duration and the curves K2 and K3 each show a reduced radiation duration of the plastic end disc. The melting temperature $T_s$ is illustrated as a dashed line. Moreover, there are two sections M1 and M2 that correspond to the materials. For example, at the penetration depth d=0 there exists the surface O of the filter end disc 7.

One can see that the maximum temperature is existing in the vicinity of the boundary surface between the two materials M1 and M2. In this way, for example, the boundary surface can be heated and melted quickly without "burning" the surface. For example, polyamide with the designation PA6 can be used as a suitable material for filter end discs. The outer material area M1 corresponds in this connection, for example, to polyamide of natural color while the core area with the second plastic molding material M2 is made of polyamide that is colored, for example, with soot particles. Modified polypropylene of the type Admer QB510E would be suitable as a water-impermeable outer material. Accordingly, a significantly higher absorption of the impinging radiation by the core material M2 results so that in the vicinity of the boundary layer a higher temperature will develop than in the surface area.

The radiation duration can be adjusted such that at least the material M1 will be heated such that the melting point is reached. The curve K2 corresponds, for example, precisely to suitable radiation duration. One can see moreover in FIG. 3 that the temperature in the first outer material M1 is very homogenous and decreases only insignificantly in the direction toward the second material. This is advantageous because the corresponding nonwoven filter material is pressed into the melted material layer M1 and only to a minimal proportion into the melted material layer M2 in order to form a fluid-tight closure.

A filter end disc that is produced, for example, according to a mono-sandwich method and is comprised of two components with an inner core and an outer layer is therefore particularly suitable to form a filter efficiently and quickly.

Figure 4A:
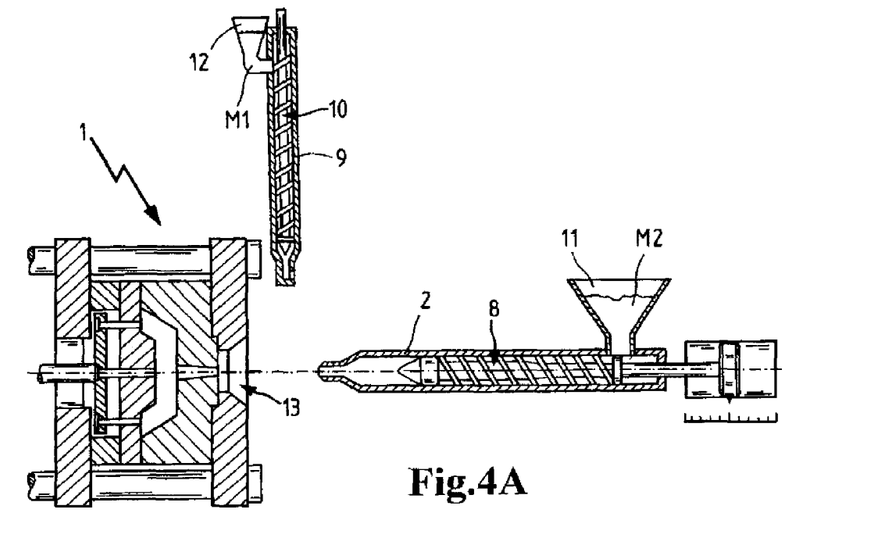
FIGS. 4A, 4B and 4C: a section illustration of an injection mold for a mono-sandwich method for producing a filter end disc.
Figure 4B:
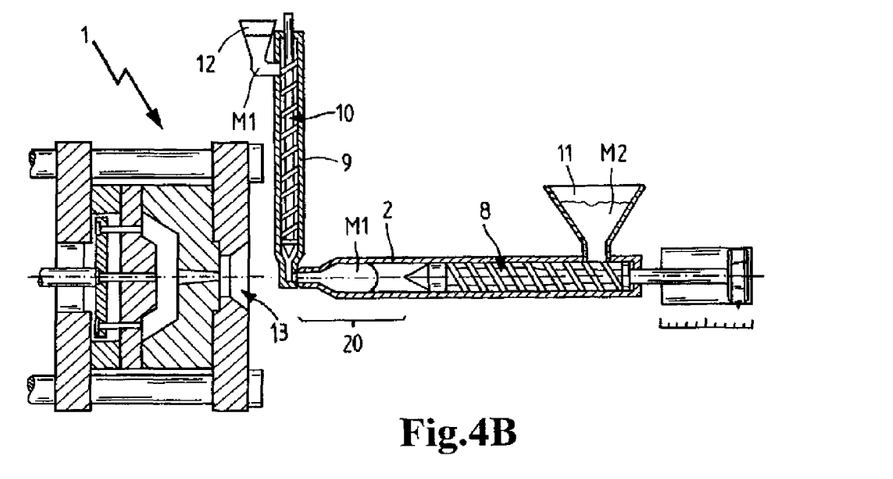
Figure 4C:
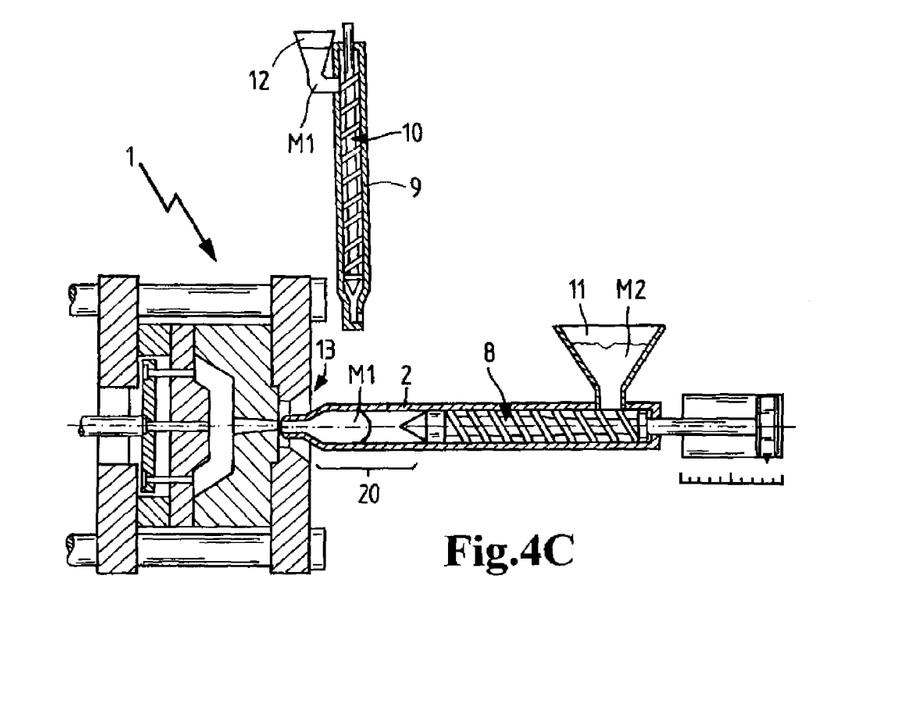
Figure 5A:
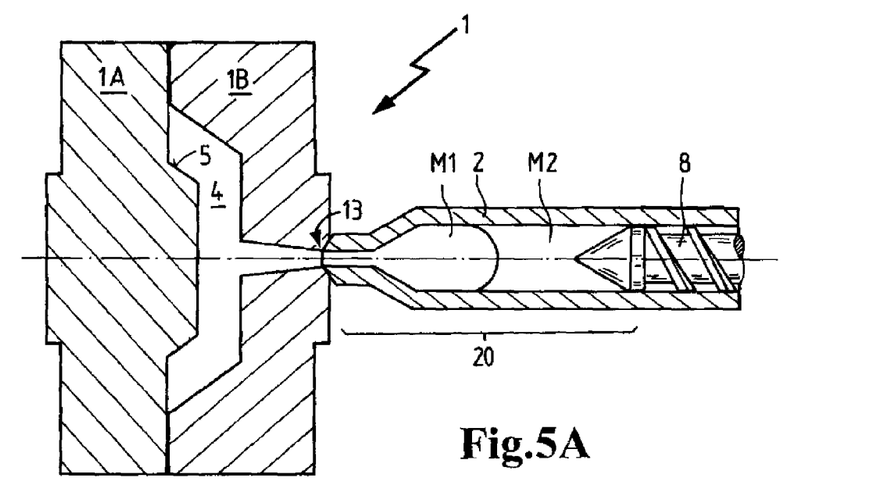
FIGS. 5A-5C: an illustration of the injection mold during an injection process according to a mono-sandwich method.
Figure 5B:
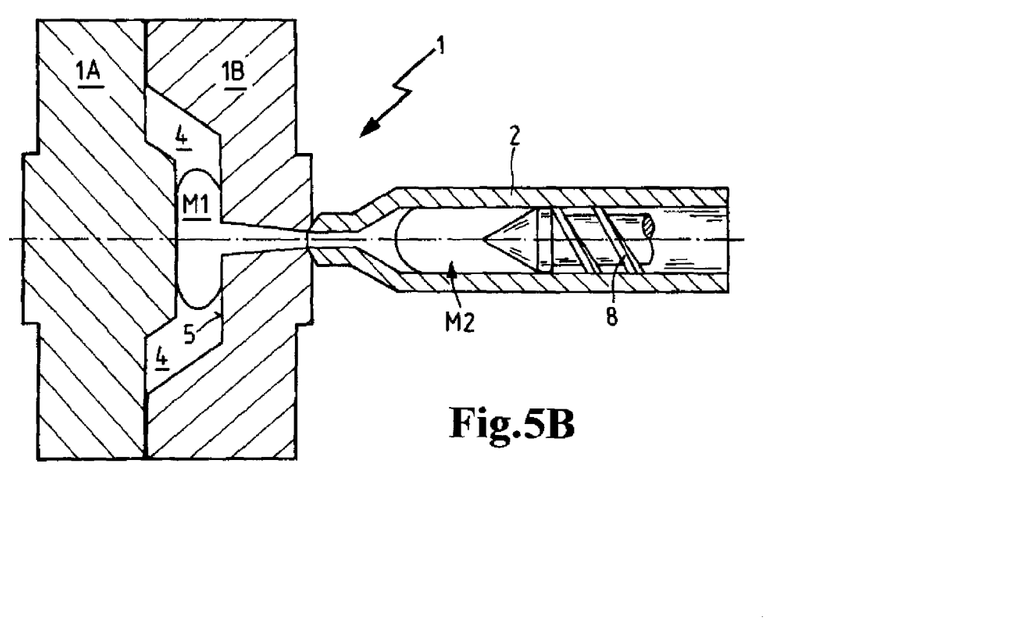
Figure 5C:
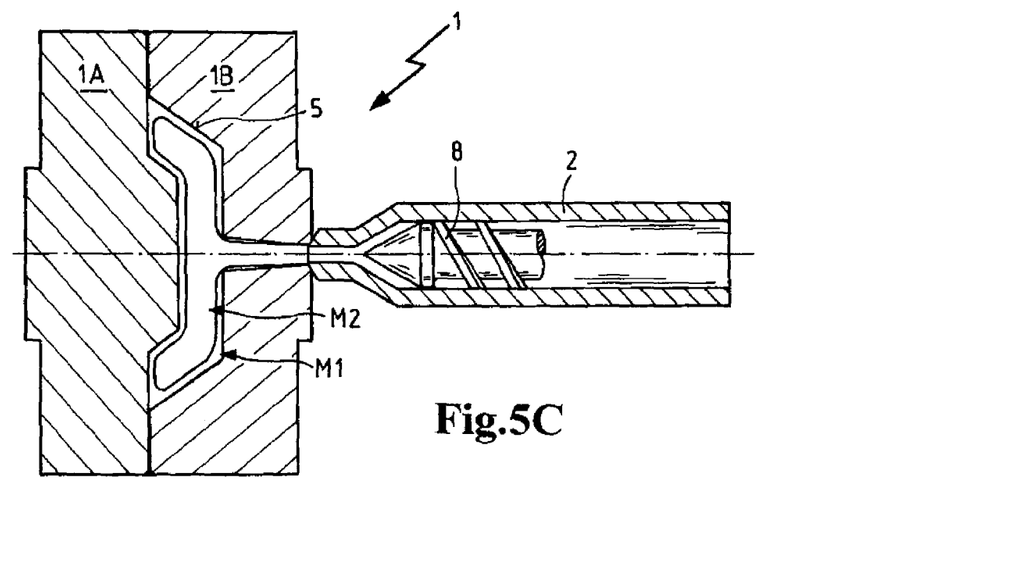

FIGS. 4 and 5 show an exemplary mono-sandwich method for the production of a filter end disc. In this connection, the FIGS. 4A-4C show preparatory steps in order to fill an extruder with a suitable plastic molding material mixture and the FIGS. 5A-5C show different processing states during the injection process of the two plastic molding materials.

In FIG. 4 a mold 1 is illustrated with a fill socket 13. Moreover, two extruders 2, 9 are provided wherein the extruder 2, which is arranged horizontally in FIG. 4, is the main extruder. To both extruders 2, 9 material reservoirs 11, 12 are coupled that contain the respective plastic molding materials M1 and M2. The main extruder 2 is fillable with a second plastic molding material M2, i.e., the material which, with regard to heat absorption and conversion properties, causes a greater heat development upon irradiation. The two extruders 2, 9 have moreover suitable transport worms 8, 10 or other devices in order to transport the thermoplastic material M1 or M2 in the direction of the respective outlet opening. They are identified by reference numerals 8 and 10. First, as illustrated in FIG. 4A in more detail, both extruders 2, 9 each are filled completely with the plastic molding material M1 and M2.

As illustrated in FIG. 4B, first the opening of the main extruder 2 is connected with the opening of the secondary extruder 9. Subsequently, in a forward area 20 of the main extruder 2 the first plastic molding material M1 is injected. In this way, the material mixture M1 and M2 as well as the sequence for the subsequent injection process in the mold 1 are realized. The tip of the main extruder 2 is thus filled with the first plastic molding material M1. This is followed by the second plastic molding material M2.

Subsequently, the secondary extruder 9 is separated and the tip of the main extruder 2 is inserted into the fill socket 13 of the mold. This is illustrated in FIG. 4C in more detail. It is also provided that in the forward area of the tip 20 the two material sequences M1 and M2 are present in accordance with their subsequent injection process into the mold 1.

FIG. 5 shows in detail the injection process of the two materials M1 and M2 into the mold.

In FIG. 5A the prepared extruder 2 is attached to the fill socket 13 of the mold 1. The mold 1 has two parts 1A and 1B that together form the interior 4 with an interior wall 5. The extruder 2 has in the forward area 20 the two materials M1 and M2 that are injected by a plunger or another suitable conveying device 8, for example, a worm. Moreover, in case thermoplastic material is used as the plastic molding material, the extruder injector or the entire extruder 2 is appropriately heated.

FIG. 5B shows the state in which the first plastic molding material M1 has been introduced already partially into the mold 1 by the plunger 8 in the extruder 2. In this connection, the material M1 substantially adheres to the surface 5 of the inner wall in the interior 4 of the mold 1.

Finally, as illustrated in FIG. 5C, also the second plastic molding material M2 is injected into the mold 1. As a result of cooling and solidification of the first plastic molding material on the inner wall 5 of the mold, the second plastic molding material substantially remains within the interior of the resulting filter end disc.

It can be seen that the mold 1A, 1B itself is not moved or changed. The interior cavity 4 during the injection process always has the same volume. Shaping or distribution of the injected material by a change of the inner wall 5 is not done. The cavity 4 and the shape of the mold 1A, 1B remain constant.

Figure 6:
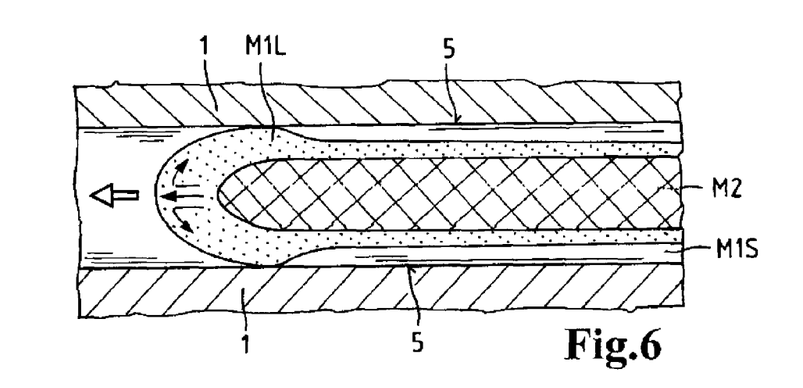
FIG. 6: a detail section view during an injection process of a two-component plastic molding material.

FIG. 6 shows somewhat more detailed the processes upon injection of the material mixture. FIG. 6 shows a cross-section of the mold 1 with a respective surface 5. The surface 5 is relatively cold so that upon injection of the first plastic molding material M1 the temperature drops below the melting point $T_s$ on the surface 5 so that a layer M1S of solidified first plastic molding material M1S is formed. The arrows illustrated in FIG. 6 indicate the flow or injection direction of the plastic molding material M1L in the liquid state. Since cooling does not occur suddenly, in the subsequent injection step of the second plastic molding material M2 an inner area of the second plastic molding material M2 results. The geometry of the mold 1 and the injection rate are selected such that the first and second plastic molding materials will not mix but, as illustrated in FIG. 6, the outer layer of the resulting filter end disc is comprised of the first material (M1S).

Figure 7:
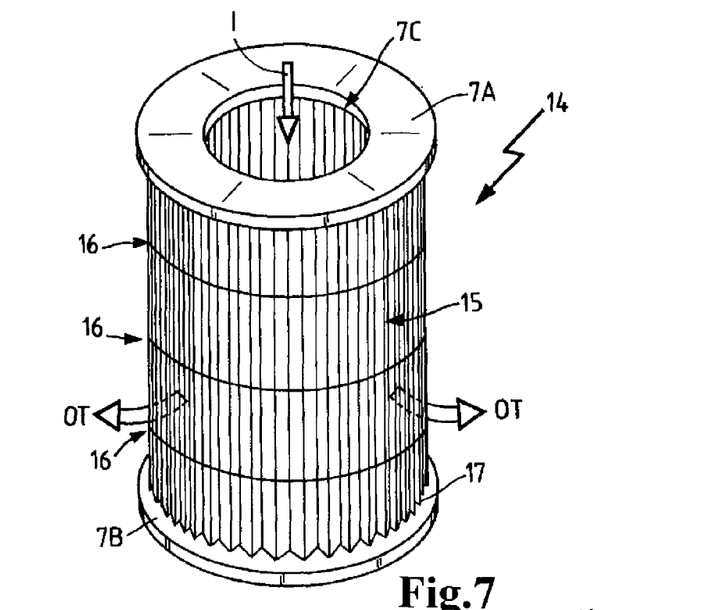
FIG. 7: a perspective view of a motor vehicle fluid filter.

In FIG. 7 an operating medium filter for a vehicle, for example, an oil filter or air filter, with an appropriately produced filter end disc is illustrated. The corresponding fluid filter 14 has an upper and a lower filter end disc 7A, 7B wherein, for example, the upper filter end disc 7A has an opening 7C for introduction of fluid, for example, fuel or air. Between the two filter end discs 7A, 7B a folded nonwoven filter material 15 is arranged in a cylinder shape that, for example, may be held in shape by means of suitable reinforcements 16.

An appropriate filtering of incoming fluid I into the interior of the resulting cylinder of the filter material 15 exits through the filter material as purified fluid OT. This is indicated by the arrows I and OT in the FIG. 7. The flow direction, of course, can also be from the exterior to the interior and thus the filtration begins at the outer jacket of the filter element. In order to connect the filter end discs 7A and 7B with the filter material 5 in a fluid-tight way, as indicated before, the respective filter end disc is heated at the side facing the filter material 15 so that at the surface a melt of the plastic molding material of the filter end disc 7A, 7B is formed. Subsequently, the rim or the profile of the folded filter nonwoven is pressed into the melt which subsequently solidifies. In general, excellent seal-tight transitions are provided in this way.

Figure 8:
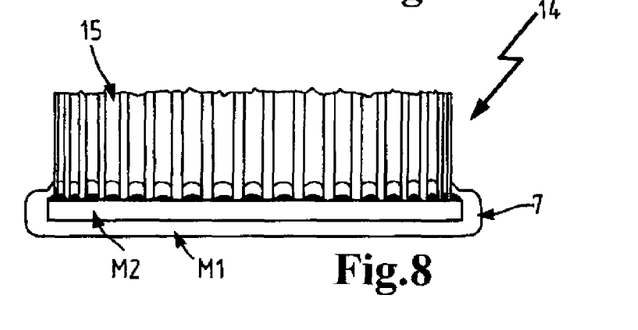
FIG. 8: a section illustration of a motor vehicle fluid filter.

In FIG. 8, a cross-section of the corresponding fluid filter 14 is illustrated in a detail view. In this connection, in FIG. 8 the situation is illustrated in which the filter medium 15 has been pressed the melted material of the filter end disc 7 and the melted material has solidified. FIG. 8 shows that, as a result of the displacement upon pressing in the fold profiles into the filter end disc 7, a seal-tight closure is formed between the folds and the filter end disc material. Also shown in FIG. 8 is that the second plastic molding material M2 has also been partially melted by irradiation so that the penetration depth of the folds 15 is increased.

So that an appropriate filter end disc and the resulting motor vehicle filter also fulfill the aesthetic demands of a costumer, the two materials M1 and M2 can be colored with the same color without their properties with regard to heat conversion of impinging radiation being changed significantly.

In order to improve the sealing action between the fold profile edges and the end discs 7A, 7B, the respective end disc can be additionally provided with a sealing element.

Figure 9:
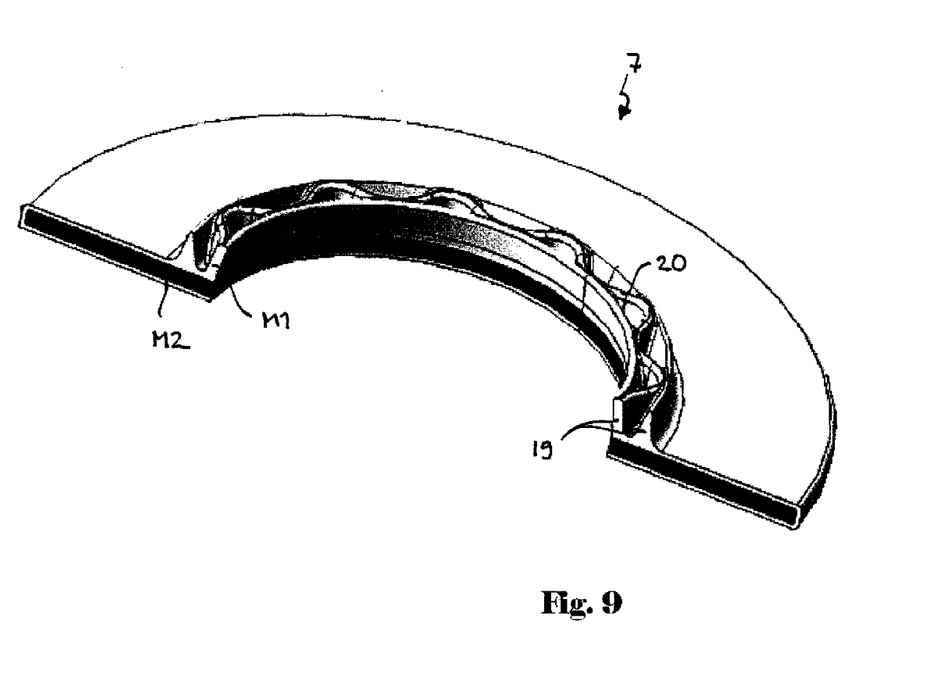
FIG. 9: a sectioned perspective view of a filter end disc.

FIG. 9 shows a sectioned perspective view of a further embodiment of a filter end disc 7. In this connection, on the end face which is facing upwardly in the orientation of FIG. 9, a sealing element 19 is provided which exclusively is formed by the outer plastic molding material M1. The sealing element 19 comprises two concentric rings 19 that project away from the surface of the end disc 7. In between a meandering material web 20 is provided. The outer plastic molding material M1 which also encompasses the sealing element 19 is preferably made of a softer plastic material than the inner core material M2. The core material M2 is illustrated in black. This flexible sealing geometry 19 can be matched to the respective conditions with regard to the folds to be attached thereto. The projecting webs 19, 20 are than melted and joined with the nonwoven filter material, as illustrated in FIG. 8. Because of the additional melted material of the sealing webs more plastic material can be joined with the fold profiles and an improved sealing action between the folded nonwoven and the end disc is provided.

An end disc 7 with integrated seal is thus provided wherein the outer material in general is of higher quality and more expensive. By producing in a mono-sandwich method or co-injection method the increased usage of lower quality core material in a less complex way is enabled.

Figure 10:
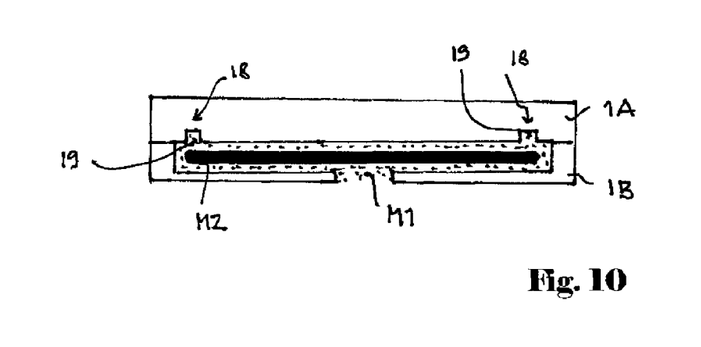
FIG. 10: a section view of a further injection mold for a mono-sandwich method for producing a filter end disc.

FIG. 10 shows schematically an embodiment of a mold 1 suitable for a filter end disc to be produced in accordance with the embodiment illustrated in FIG. 9. The mold 1A, 1B is of a two-part configuration and forms of constant cavity into which the plastic molding materials are injected. The upper tool half 1A is provided with recesses 18 into which the first injected plastic molding material M1 penetrates for forming the sealing element 19. The second plastic molding material M2 forms the core of the filter end disc and is illustrated in black. Because of the configuration of the recesses it is possible to achieve especially thin sealing webs or sealing structures projecting away from the disc and in this way material can be saved. Preferably, several concentric recesses are provided in order to provide many projecting sealing webs.

The invention claimed is:
1. A method for producing a fluid filter end disc, comprising:
  providing a mold having an inner cavity wall enclosing a cavity therein and including a fill opening extending from said cavity to an exterior of said mold;
  providing a first plastic molding material and a second plastic molding material;
  injecting said first plastic molding material into said mold through said fill opening;
  subsequently injecting said second plastic molding material into said mold though said fill opening,
  wherein injecting of said first and second plastic materials is practiced by a mono-sandwich method or co-injection method,
  wherein said subsequently injecting a second plastic step, said second plastic molding material is substantially enclosed by the first plastic molding material,
  solidifying said first and second plastic materials to form said end disc.
2. The method according to claim 1, wherein in said first plastic and second plastic injecting steps, an inner volume of said cavity of said mold into which the first and the second plastic molding materials are injected remains constant during injection.

3. The method according to claim 2, wherein
in said injecting a first plastic step material step, said first plastic molding material in a solid material state is water-impermeable and/or water vapor-impermeable.

4. The method according to claim 3, wherein
in said injecting a second plastic molding material step, said second plastic molding material in a solid material state has hygroscopic properties.

5. The method according to claim 1, wherein
in said providing a mold step, said inner cavity wall includes a recess projecting outwardly way from and in communication with said cavity;
wherein said method further comprises the steps of
filling said recess with plastic material during said injecting steps;
wherein said solidifying step includes
forming a sealing element in said recess, said seal element projecting away from an end face of said filter end disc.

6. The method according to claim 4, wherein
in said providing a mold step, said inner cavity wall includes a recess projecting outwardly way from and in communication with said cavity;
wherein said method further comprises the steps of
filling said recess with plastic material during said injecting steps;
wherein said solidifying step includes
forming a sealing element in said recess, said seal element projecting away from an end face of said filter end disc.
wherein in said filling and forming steps, said sealing element comprises exclusively the first plastic molding material.

7. The method according to claim 5, wherein in said filling and forming steps, said sealing element comprises exclusively the first plastic molding material.

8. The method according to claim 7, wherein
said first plastic molding material in the solid state is softer and/or more flexible than said second plastic molding material in the solid state.

9. The method according to claim 1, wherein
said second plastic molding material converts a radiation with predetermined radiation properties more strongly into heat than said first plastic molding material.

10. The method according to claim 1, wherein
in said injecting steps, the injection is realized such that said first plastic molding material forms an outer surface of said filter end disc.

11. The method according to claim 1, further comprising:
coloring said first and said second plastic molding material such that absorbance, reflectance, and/or transmission properties for the radiation in each of said first and second materials substantially remains unchanged and said two plastic molding materials have the same color.

12. A method of manufacturing a fluid filter comprising a method according to one of the claims 1-11 and further comprising the steps:
irradiating said filter end disc by a radiation with said predetermined radiation properties;
melting at least partially said first plastic molding material of said end disc;
applying a filter material onto said at least partially melted first plastic molding material of said end disc.

13. The method according to claim 12, wherein said apply step further includes
pressing a folded rim of said filter material into said at least partially melted first plastic molding material.

14. A fluid filter end disc of a fluid filter of a motor vehicle produced by the method according to one of claims 1-11, wherein said end disc is produced according to a mono-sandwich method or co-injection method and comprises
a first outer plastic molding material;
a second inner plastic molding material;
wherein said second plastic molding material is enclosed in said end disc by said first plastic molding material, and
wherein said first plastic molding material is water-impermeable and/or water vapor-impermeable.

15. The fluid filter end disc according to claim 14, wherein said second plastic molding material is hygroscopic.

16. The fluid filter end disc according to claim 15, wherein said first plastic molding material forms a closed water-impermeable and/or water vapor-impermeable outer surface of said filter end disc.

* * * * *